United States Patent
Pan et al.

(10) Patent No.: US 9,819,188 B1
(45) Date of Patent: Nov. 14, 2017

(54) DIRECT CURRENT TRANSMISSION SYSTEM AND METHOD

(71) Applicant: ABB Schweiz AG, Baden (CH)

(72) Inventors: Jiuping Pan, Raleigh, NC (US); Li Qi, Cary, NC (US); Hongbo Jiang, Borlange (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/358,814

(22) Filed: Nov. 22, 2016

(51) Int. Cl.
*H02M 5/458* (2006.01)
*H02J 3/36* (2006.01)

(52) U.S. Cl.
CPC .............. *H02J 3/36* (2013.01); *H02M 5/458* (2013.01)

(58) Field of Classification Search
CPC .......... H02M 5/40; H02M 5/42; H02M 5/458; H02M 5/4585
See application file for complete search history.

(56) References Cited

U.S. PATENT DOCUMENTS

| | | | |
|---|---|---|---|
| 8,289,736 B2 | 10/2012 | Asplund | |
| 8,830,712 B2 * | 9/2014 | Fischer de Toledo | H02J 3/16 363/138 |
| 2010/0091528 A1 * | 4/2010 | Radbrandt | H02J 3/36 363/35 |
| 2014/0347897 A1 * | 11/2014 | Broussard | H02J 3/36 363/35 |

FOREIGN PATENT DOCUMENTS

CN 102738819 A 10/2012

OTHER PUBLICATIONS

R. Adapa, "High-Wire Act," IEEE Power and Energy Magazine, Oct. 18, 2012, pp. 18-29, USA.
R. Adapa,"EPRI Program 162 HVDC Systems," Electrical Power Research Institute, Jul. 23, 2008, 44 pgs. USA.
L. Ying et al., "Research on the Technical Scheme for Conversion of 500kV Submarine SCLF AC Cable Circuit to DC Operation in Hainan Grid-connection Project," Cigre, 2012, 6 pgs, France.
(Continued)

*Primary Examiner* — Gary L Laxton
(74) *Attorney, Agent, or Firm* — Taft Stettinius & Hollister LLP

(57) ABSTRACT

Unique systems, methods, techniques and apparatuses of power transmission systems are disclosed herein. One exemplary embodiment is an AC power transmission system converted for transmission of high voltage direct current (HVDC) power, the converted system comprising an AC cable system, a first converter system, a second converter system, and a control system. The first converter system is structured to receive and convert AC power to DC power and output the DC power. The second power converter system is structured to receive the DC power, convert the DC power to a second AC power, and output the second AC power. The control system is structured to receive power demand information, determine a reduced DC voltage less than a rated HVDC voltage, control the first converter system such that the DC power is controlled to the reduced voltage, and control the second power converter system to operate in an active power control mode.

21 Claims, 4 Drawing Sheets

(56) References Cited

OTHER PUBLICATIONS

M. Callavik et al., "Roadmap to the Supergrid Technologies—Update Report," FOSGW62 Technological, Mar. 2013, 107 pgs.
M. Hausler et al., "Converting AC power lines to DC for higher transmission rating", ABB Review, Mar. 1997, 8 pgs, available at https://library.e.abb.com/public/139412d24d16673fc1257b1a005b4ce8/04-11%20ENG%209703.pdf.
G. Bathurst et al., "MVDC—The New Technology for Distribution Networks," 11th IET International Conference on AC and DC Power Transmission, UK, Feb. 10, 2015, 5 pgs., United Kingdom.

* cited by examiner

DIRECT CURRENT TRANSMISSION SYSTEM AND METHOD

BACKGROUND

The present disclosure relates generally to power transmission systems. Alternating current (AC) power lines are commonly used in bulk power transmission. As the number of customers connected to the power transmission system increases, power demand will exceed the capabilities of existing AC power lines. One way to increase power line capability is to convert an existing AC power line to a direct current (DC) power line. Increasing power line capability is particularly important in areas where installing additional power lines are costly and time consuming, such as urban areas. Existing methods and systems for converting power transmission systems to DC power lines suffer from a number of shortcomings and disadvantages. There remain unmet needs including increasing transmission line longevity, reducing working stress, reducing operating costs, reducing power losses, and increasing reliability. For instance, a DC power line constantly transmitting power at a high voltage is subject to high working stress, reducing line longevity. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for a power transmission system. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
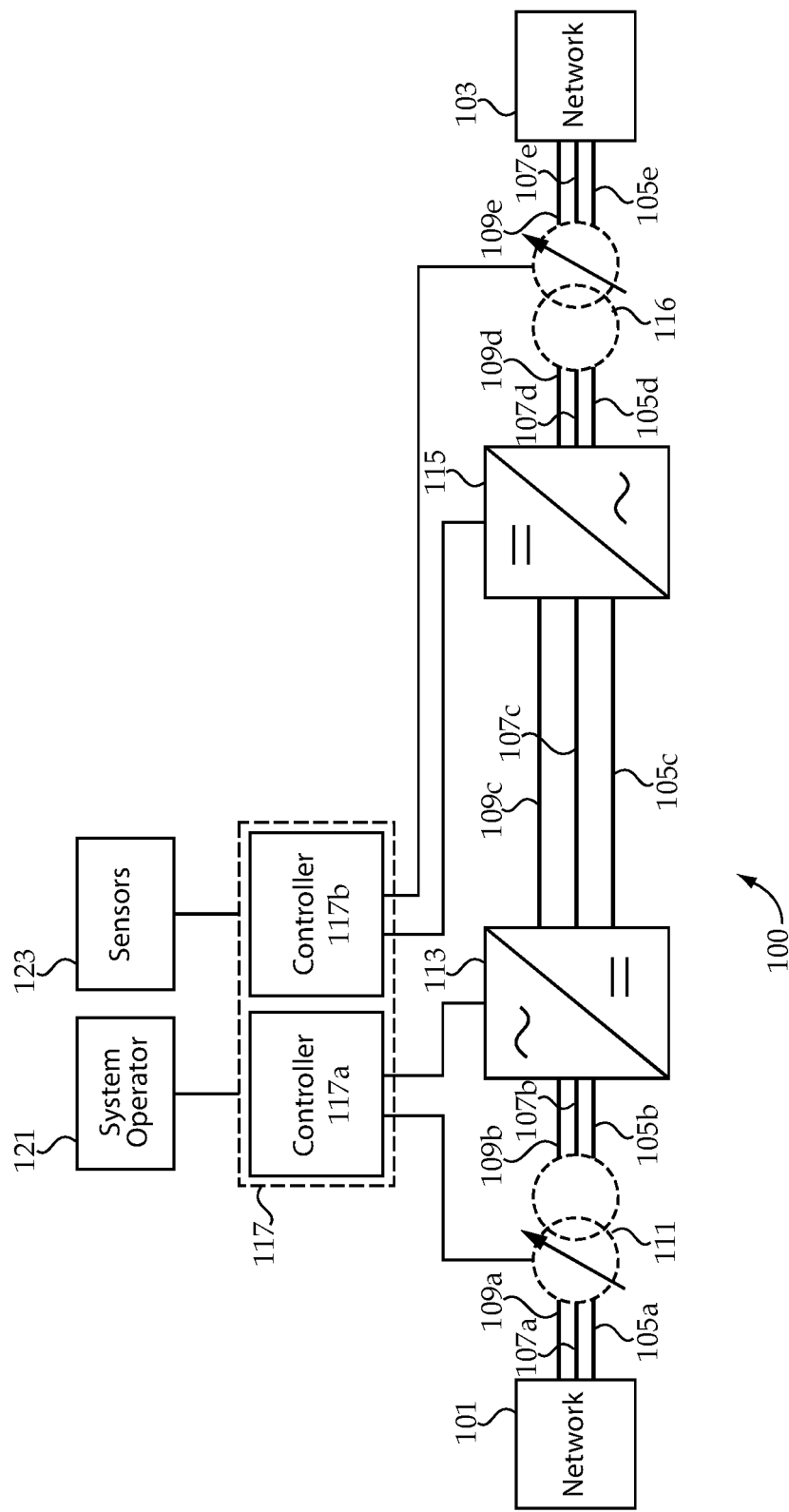
FIG. 1 illustrates an exemplary power transmission system.

With reference to FIG. 1 there is illustrated an exemplary power transmission system 100 electrically coupled between a first power network 101 and a second power network 103 in a symmetric monopole configuration. In the illustrated embodiment, system 100 is structured to transmit AC power from network 101 and network 103. System 100 may also be structured to transmit bidirectional AC power between network 103 and network 101. In the illustrated embodiment, system 100 transmits three phase AC power. In other embodiments, system 100 may be arranged in another configuration, such as asymmetric monopole configuration, bipole configuration, series bridge configuration, or a multi-terminal configuration. Networks 101 and 103 may be a power source, an electric load, a network of distributions lines and/or a network of transmission lines. It shall be appreciated that system 100 may be implemented in transmission or distribution lines, including overhead lines, underground lines, urban power lines, high voltage lines, medium voltage lines, or low voltage lines to name but a few examples.

System 100 includes three high voltage transmission lines 105, 107, 109. The transmission lines may be newly constructed lines or existing lines adapted to incorporate other elements of system 100. Transmission lines 105, 107, 109 may be high voltage AC transmission lines structured to transmit AC power with a voltage between 69 kV to 345 kV over a distance of a few miles to several hundred miles. Transmission lines 105, 107, and 109 may be existing subterranean urban power lines retrofitted with the other elements of system 100 to enhance transmission line power capabilities.

System 100 includes a transformer 111 with a tap changer electrically coupled to network 101 by way of line segments 105a, 107a, and 109a. The transformer 111 is structured to regulate voltage on transmission lines 105, 107, 109 by receiving AC power with an undesired voltage from network 101, adjusting the position of the tap, and outputting AC power with the fixed, desired voltage. In certain embodiments, transformer 111 may not be included in system 100. It shall be appreciated that any or all of the foregoing features of transformer 111 may also be present in the other tap changers disclosed herein.

A power converter 113 is electrically coupled to transformer 111 by way of line segments 105b, 107b, and 109b. Converter 113 includes a plurality of switching devices and is structured to receive AC power from transformer 111, convert the AC power to DC power, and output DC power. In one arrangement, converter 113 outputs DC power with a positive voltage to one of line segments 105c, 107c, and 109c and DC power with a negative voltage to another one of the line segments 105c, 107c, and 109c. The third transmission line may be used as a neutral line, a supplemental transmission line in response to high power demand, a metallic return, or a replacement transmission line in response to a failure or maintenance outage of one of the other transmission lines. During implementation of system 100, a selection may be made as to which line segment of 105c, 107c, and 109c is used as a neutral line, a supplemental transmission line, a metallic return, or a replacement transmission line based on the relative health of the transmission lines, including line insulation integrity and line capacity. For example, an existing AC power line exhibiting the most degraded conductor and/or insulation may be selected as a neutral line, a supplemental transmission line, a metallic return, or a replacement transmission line. In certain embodiments, power converter 113 includes a plurality of switching devices arranged in a modular multilevel converter topology or another cascaded converter topology. Power converter 113 may be a two level or three level voltage source converter or a current source converter. It shall be appreciated that any or all of the foregoing features of converter 113 may also be present in the other power converters disclosed herein.

A second converter 115 is electrically coupled to line segments 105c, 107c, and 109c. Converter 115 is structured to receive DC power from line segments 105c, 107c, and 109c, convert the received DC power to AC power, and output the AC power. In certain embodiments, system 100 includes bypass switches selectively coupling network 101 to network 103 in the event of system 100 downtime, such as during maintenance or a component malfunction of converter 113 or converter 115. In the event of the malfunction of or maintenance on one of line segments 105c, 107c, or 109c, system 101 may be operated as an asymmetric monopole configuration.

A transformer 116 with a tap changer is electrically coupled to converter 115 by way of line segments 105d, 107d, and 109d. Network 103 is electrically coupled to transformer 116 by way of line segments 105e, 107e, and 109e.

System 100 includes a control system 117 which includes controller 117a and 117b. In certain embodiments where system 100 is structured to transmit bidirectional power, controller 117a is configured to perform the functions described with respect to controller 117b and controller 117b is configured to perform the functions described with respect to controller 117a. Each controller may be a single device or a plurality of devices configured to perform the functions described herein with respect to the controller.

Controller 117a is electrically coupled to converter 113. Controller 117a is also electrically coupled to a system operator 121 and a plurality of system sensors 123. In certain forms a subset of system sensors 123 may be dedicated to and operatively coupled with controller 117a and the system equipment associated therewith and another subset of system sensors 123 by be dedicated to and operatively coupled with controller 117b and the system equipment associated therewith. In certain forms one or more of system sensors 123 may be operatively coupled with both controller 117a and controller 117b.

Controller 117a is structured to operate converter 113 so as to receive AC power from network 101, convert the received AC power to DC power, and transmit the DC power to converter 115. Controller 117a operates converter 113 by transmitting a plurality of activation signals to a plurality of switching devices of converter 113 so as to selectably open and close the plurality of switching devices. Controller 117a may be configured to generate activation signals using pulse width modulation. Controller 117a is configured to generate activations signals using data received from system operator 121 and sensors 123. Controller 117a may regularly evaluate whether to change the DC output voltage of converter 113, for example in time periods of five minutes.

During periods of normal power demand, such as light or medium power demand, controller 117a lowers the DC output voltage of converter 113. For example, controller 117a may operate converter 113 so as to lower the DC power voltage to 50% of the highest high voltage DC (HVDC) voltage at which line segments 105c, 107c and 109c are designed to operate, also referred to herein as the rated DC voltage or rated HVDC voltage. For example, the rated HVDC voltage for a transmission line may be in a range including 80 kV to 320 kV. It shall be appreciated that the rated DC voltage is a rated voltage established in connection with the conversion of line segments 105c, 107c and 109c from AC power transmission to DC power transmission and that the rated DC voltage for line segments may be greater than the rated peak line-to-ground AC voltage at which line segments 105c, 107c and 109c were initially designed to operate. The range of DC voltage output by converter 113 may be 0 V to rated HVDC voltage. In certain embodiments a wide range of operating DC voltage levels can be achieved within this range. Certain embodiments, for simplicity of design and operation, may define a set of operating DC voltage levels, for example, 2-3 operating DC voltages levels.

During periods of peak power demand, controller 117a temporarily increases the DC output voltage of converter 113 to a higher voltage level, such as the rated DC voltage. Controller 117a may be structured to control the tap changer of transformer 111. In certain embodiments, controller 117a may operate converter 113 so as to output two or more increased DC power voltage levels. Controller 117a may operate converter 113 so as to control the reactive power components of the AC transmission system.

System operator 121 is configured to transmit power dispatch orders in the form of reference value data to controllers 117a and 117b. The values of the reference value data represent an optimized output based on forecasted demand and energy cost. The reference values correspond to desired electrical characteristics of the power transmission between network 101 and 103. System operator 121 may transmit an active power reference value, a reactive power reference value and an AC voltage reference value. Operator 121 may be a grid operator or a high level controller such as a wide area control system. In certain embodiments, system operator may only transmit one of a reactive power reference value and an AC voltage reference value. System operator 121 may transmit reference value data in regular intervals. In certain embodiments, system operation 121 transmits reference value data to controllers 117a and 117b in five minute intervals.

System sensors 123 are configured to measure electrical characteristics of system 100 and transmit measurement data to controllers 117a and 117b. For example, sensors 123 may measure DC voltage on line segments 105c, 107c, and 109c; the active power component of the AC power on line segments 105e, 107e, and 109e; the reactive power component of the AC power on line segments 105e, 107e, and 109e; or the line to ground voltage of the AC power on line segments 105e, 107e, and 109e. Sensors 123 may be located locally at each converter and structured to collect local measurements or sensors 123 maybe located remotely and structured to collect wide area measurements.

Using the data from system operator 121, for example an active power reference value, controller 117a is structured to calculate a DC voltage reference value. Controller 117a calculates a voltage reference value for each time period. The voltage reference value is determined by system power transmission capacity and service life goals. For example, when system 100 must transmit power between network 101 and network 103 greater than or equal to 85% of the rated power transmission capabilities of system 100, the voltage reference value may correspond to rated HVDC voltage. When system 100 must transmit power lower than or equal to 85% of the rated power transmission capabilities of system 100, the voltage reference value may correspond to a reduced DC voltage based on the service life goals of system 100. A reduction of the DC operating voltage, such as a 5% to 10% reduction from rated HVDC voltage, extends the service life of the transmission lines.

During an emergency operation event, where system 100 needs to respond to a change in network 101 or network 103 before the beginning of the next time period, controllers 117*a* and 117*b* receive an emergency control signal from system operator 121, or another high level controller, and immediately modify the operation of converters 113 and 115, respectively, in response to the emergency control signal.

Controller 117*b* is electrically coupled to converter 115. Controller 117*b* is also electrically coupled to a system operator 121 and a plurality of system sensors 123. Controller 117*b* is structured to operate converter 115 so as to receive DC power from converter 113, convert the DC power to AC power, and output the converted AC power to network 103. Converter 115 is controlled with controller 117*b* so as to output AC power with the voltage, active power component, and reactive power component indicated by the data received from system operator 121.

For smooth transitions between the rated and the reduced DC operating voltages, the active power component of the AC power output by converter 115 and the voltage of the DC power output with converter 113 may need to be gradually ramped up or ramped down to the desired levels at different ramping speeds. For instance, when the DC operating voltage decreases from the rated value to the reduced value for normal power demand conditions, the ramping speed of active power may be faster than the ramping speed of DC voltage. In contrary, when the system operation changes from the reduced DC voltage mode to the rated DC voltage mode for peak power demand conditions, the ramping speed of active power may be slower than the ramping speed of DC voltage. It shall be appreciated that any or all of the foregoing features of system 100 may also be present in the other power transmission systems disclosed herein.

Figure 2:
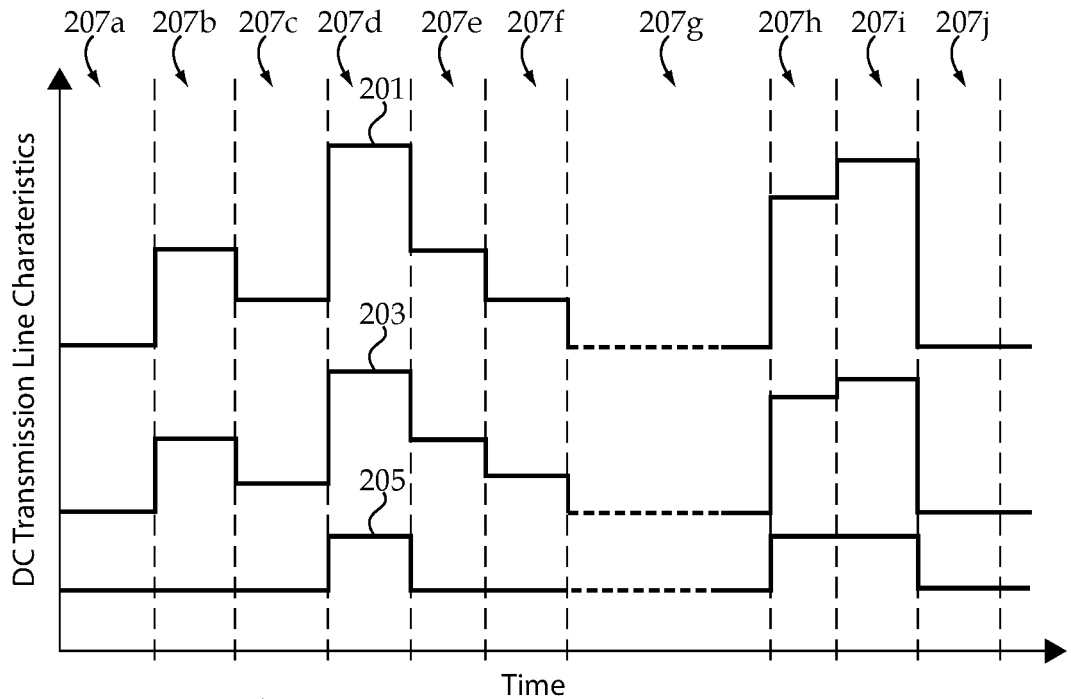
FIG. 2 is a graph illustrating power characteristics of an exemplary DC transmission system.

With reference to FIG. 2, there is a graph 200 illustrating the power characteristics of the DC power transmission portion of an exemplary power transmission system, such as system 100 of FIG. 1. Graph 200 includes DC power line 201, DC current line 203, and DC voltage line 205. DC power line 201 illustrates the DC power transmitted between converters 113 and 115. DC current line 203 illustrates the current magnitude of the DC power transmitted between converters 113 and 115. DC voltage line 203 illustrates the voltage magnitude of DC power transmitted between converters 113 and 115. The lines of graphs 200 are divided into time intervals 207*a*-207*j*. Three peak demand time periods are illustrated with time periods 207*d*, 207*h*, and 207*i*. As explained with respect to control system 117, the DC power voltage on transmission line segments between converters 113 and 115 is increased to accommodate the peak power demand. When the peak power demand subsides, the DC power voltage on the transmission line segments between converters 113 and 115 is reduced in order to reduce working stress on the transmission lines, thereby increasing transmission line longevity, as illustrated in time period 207*e* and 207*j*. As illustrated with graph 200, the DC power voltage may be adjusted at the beginning of each time period. During an emergency operation event, the DC power voltage may be increased during a time period to respond to unanticipated peak power demand or unexpected reduced power supply. Once the peak power demand has subsided, the DC power voltage may be reduced during the next time interval.

Figure 3:
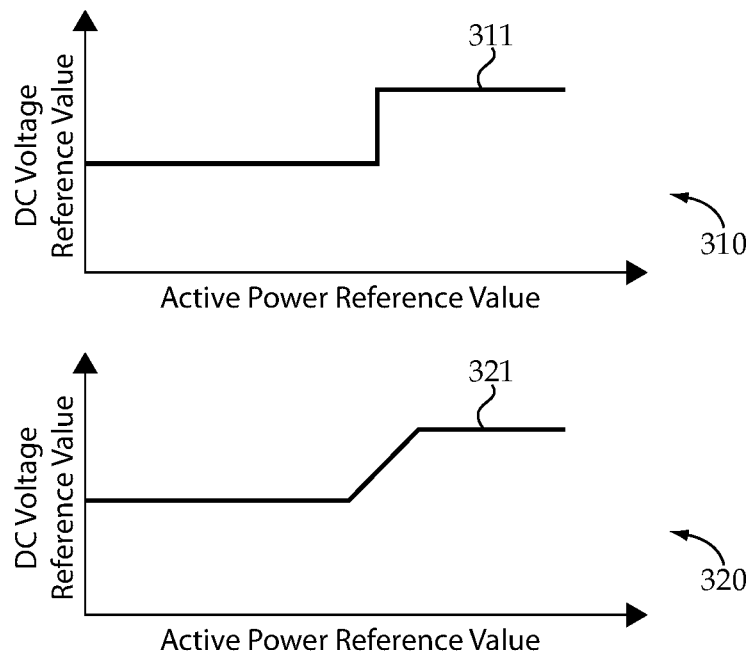
FIG. 3 is a plurality of graphs illustrating two possible DC voltage reference values used in an exemplary power transmission system.

With reference to FIG. 3, there are two graphs 310 and 320 illustrating DC voltage reference values used by an exemplary power transmission system, such as system 100 of FIG. 1. Graph 310 includes line 311 illustrating a single step increase in the voltage reference value with respect to the active power reference value calculated by controller 117*a*. For example, controller 117*a* may receive may increase the voltage reference value from 80% of rated DC voltage to 100% of rated DC voltage in response to receiving an active power reference value requiring an increase in the active power output by system 100 to a value greater than 80% of converter capacity. Graph 320 includes line 321 illustrating a gradual increase in the voltage reference value with respect to the active power reference value received by controller 117*a*. Voltage reference values are calculated with controller 117*a*. In certain embodiments, the voltage reference value is increased or decreased using a multi-step pattern, an exponential curve, or a logarithmic curve.

Figure 4:
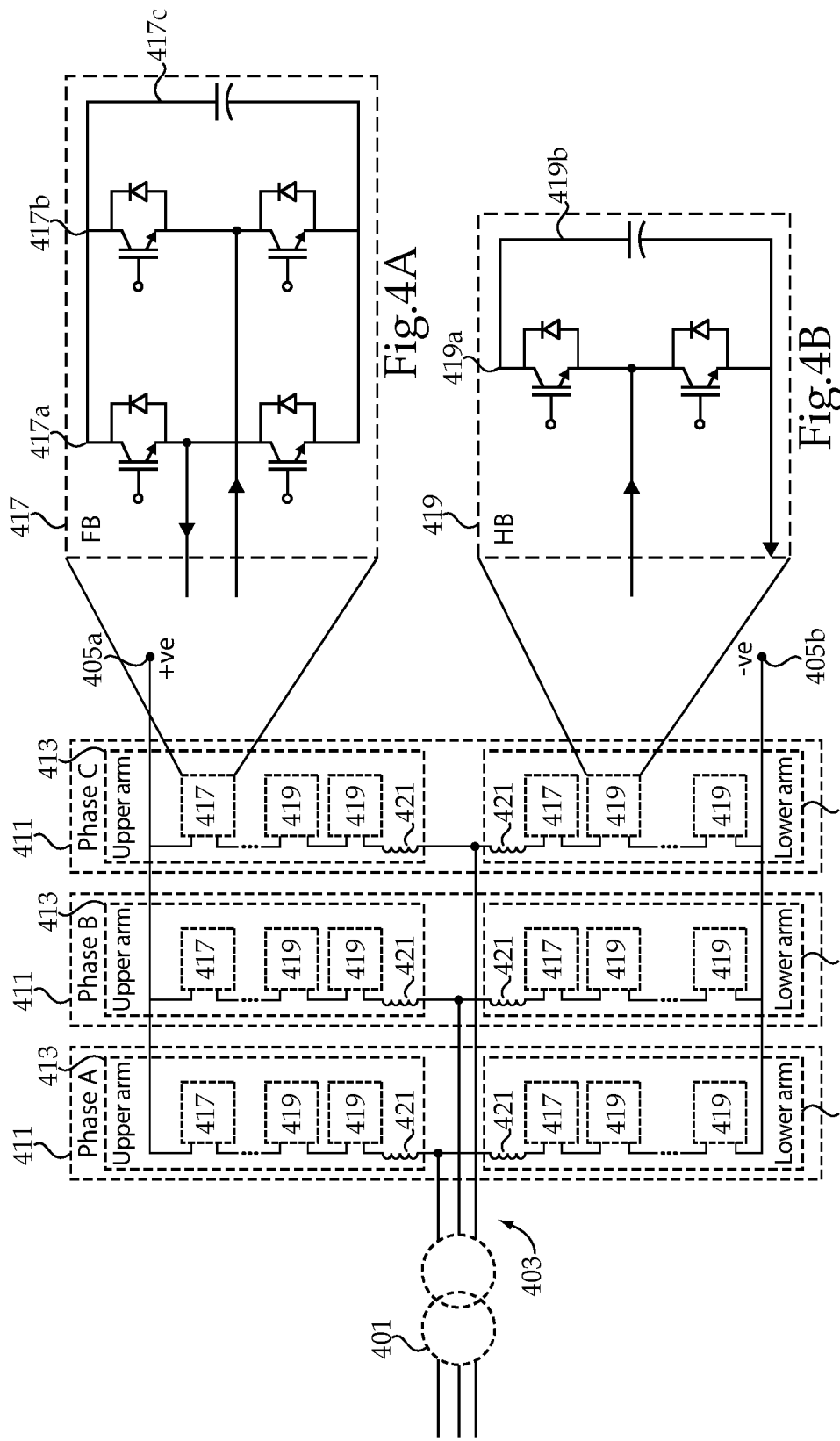
FIG. 4 illustrates a power converter in an exemplary power transmission system.

With reference to FIG. 4, there is illustrated a modulated multilevel power converter 400 for an exemplary power transmission system, such as system 100 of FIG. 1, electrically coupled to a transformer 401 by way of three AC transmission lines 403. Power converter 400 includes a plurality of converters 411, one for each phase input. Each converter 411 includes an upper arm for 413 and a lower arm 415. Each upper arm 413 includes a full bridge cell 417, a plurality of half bridge cells 419, and an inductor 421 electrically coupled in series between one AC transmission line 403 and a positive DC output terminal 405*a*. Each lower arm 415 includes a full bridge cell 417, a plurality of half bridge cells 419, and an inductor 421 electrically coupled in series between one AC transmission line 403 and a negative DC output terminal 405*b*. In certain embodiments, transformer 401 may not be necessary. Converter 401 can maintain AC voltage controllability and reactive power support capability during reduced voltage operation of system 100.

In certain embodiments, half bridge cells 419 are replaced with full bridge cells increasing the DC output range from 0 V to the rated DC voltage. For example, during light and moderate conditions, DC voltage output may operate at 50% to 80% of rated DC voltage. In certain embodiments, during light or moderate power demand, the voltage output of one or more of the series connected cells of each of the converters 411 will be reduced to zero while maintain the normal voltage output of the remaining cells. In certain embodiments, a controller may adjust activation signals received with converter 400 to step up or step down voltage, eliminating the need for transformer 401.

In other embodiments, transformer 401 is implemented with a tap changer and converters 411 do not include full bridge cells 417. The elimination of all full bridge cells reduces the DC output range to approximately 90% of rated DC voltage to rated DC voltage in order to maintain control of converter 400. To further reduce voltage, transformer 401 is required to match converter AC voltage with grid collate with a high regulating range tap changer functionality. To operate properly at wide range DC voltage, the tap changer may be used to maintain the required full capability of reactive power support.

FIG. 4A illustrates one of the full bridge cells 417 which includes two legs 417*a* and 417*b*, as well as a capacitor 417, all electrically coupled in parallel. Each leg includes two switching devices, such as an insulated gate bipolar transistor (IGBT) coupled in an antiparallel configuration with a diode, and a node. The node of each leg is electrically coupled to another cell, a DC output terminal, or an AC transmission line.

FIG. 4B illustrates one of the half bridge cells 419 which includes one leg 419*a* and a capacitor electrically coupled in parallel 419b. Leg 419a includes two switching devices, such as an IGBT coupled in an antiparallel configuration with a diode, and two nodes, each node being electrically coupled to another cell, a DC output terminal, or an AC transmission line.

Figure 5:
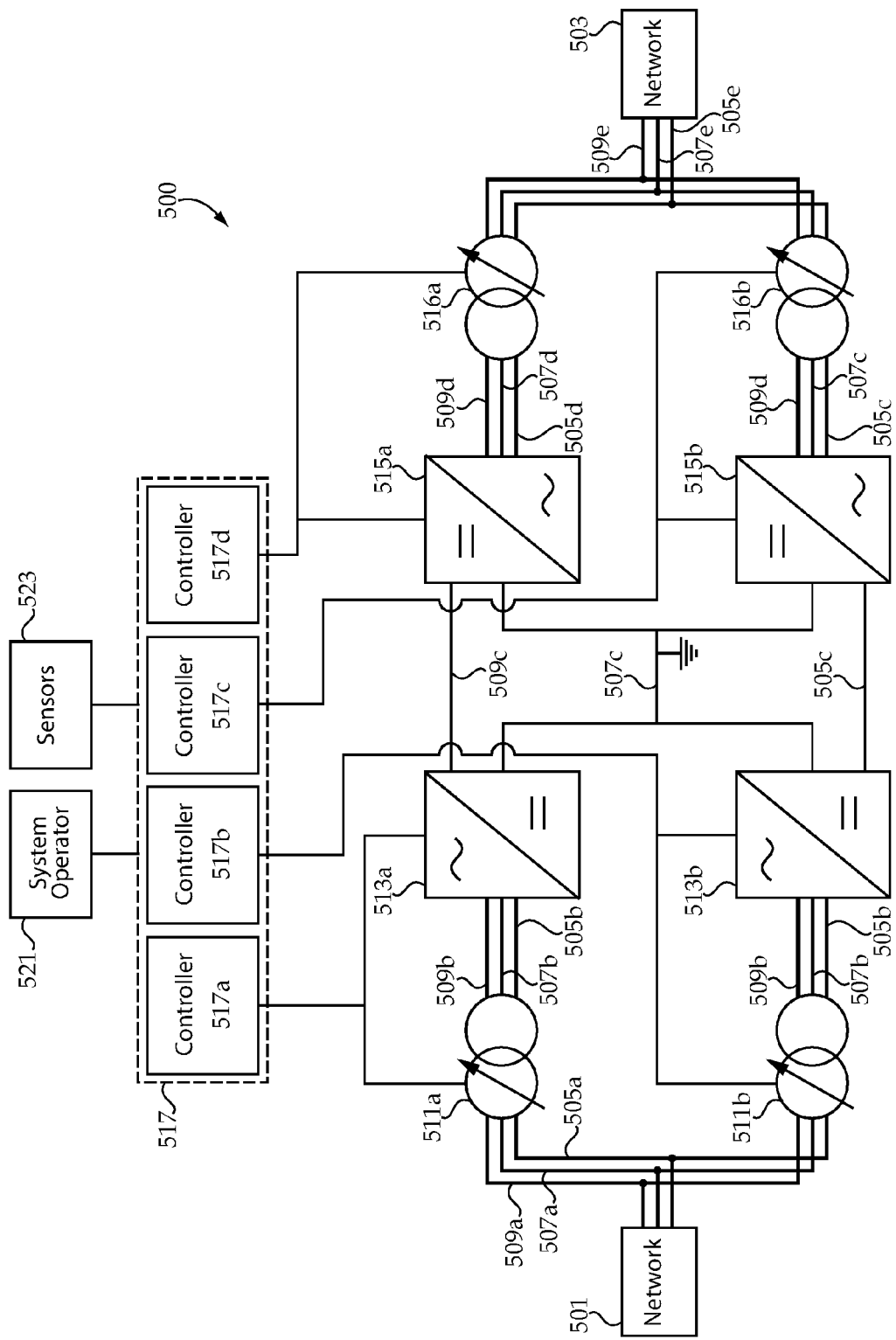
FIG. 5. illustrates another exemplary power transmission system.

With reference to FIG. 5 there is illustrated an exemplary power transmission system 500 electrically coupled between a first power network 501 and a second power network 503 in a bipole configuration. System 100 includes three high voltage transmission lines 505, 507, and 509. System 100 includes a pair of power transformers 511a, 511b each with a tap changer and electrically coupled to network 101 by way of line segments 505a, 507a, and 509a. A power converter 513a is electrically coupled to transformer 511a by way of line segments 505b, 507b, and 509b. A second power converter 513b is electrically coupled to transformer 511b by way of line segments 505b, 507b, and 509b.

Converters 513a and 513b include a plurality of switching devices and are structured to receive AC power from transformers 511a and 511b, respectively, convert the AC power to DC power, and output DC power. In one arrangement, converter 511 outputs DC power with a positive voltage to one of line segments 505c, 507c, and 509c and DC power with a negative voltage to another one of the line segments 505c, 507c, and 509c. The third transmission line, such as line segment 507c, may be used as a neutral line, a supplemental transmission line in response to high power demand, or a replacement transmission line in response to a failure or maintenance outage of one of the other transmission lines.

A pair of converters 515a and 515b are electrically coupled to line segments 505c, 507c, and 509c. Converters 515a, 515b are structured to receive DC power from line segments 505c, 507c, and 509c, convert the received DC power to AC power, and output the AC power.

A power transformer 516a with a tap changer is electrically coupled to converter 515a by way of line segments 505d, 507d, and 509d. A second power transformer 516b with a tap changer is electrically coupled to converter 515b by way of line segments 505d, 507d, and 509d. Network 503 is electrically coupled to transformers 515a and 515b by way of line segments 505e, 507e, and 509e.

System 500 includes a control system 517 which includes a plurality of controllers 517a-517d. Controller 517a is coupled to converter 513a; controller 517b is coupled to converter 513b; controller 517c is coupled to converter 515b; and controller 517d is coupled to converter 515c. Each of controllers 517a-517d are also coupled to a system operator 521 and a plurality of system sensors 523. Controllers 517a and 517b are structured to receive data from system operator 521 and the plurality of system sensors 523, and operate converters 513a and 513b, respectively, in the manner described above with respect to control system 117a of system 100 in FIG. 1. Controllers 517d and 517c are structured to receive data from system operator 521 and the plurality of system sensors 523, and operate converters 515a and 515b, respectively, in the manner described above with respect to control system 117b of system 100 in FIG. 1.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "electrically coupled to," "electrically coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. An AC power transmission system converted for transmission of high voltage direct current (HVDC) power, the converted system comprising:

an AC cable system comprising three cables with conductor dimensions and insulation dimensions configured for transmission of a rated peak line-to-ground AC voltage;

a first converter system structured to receive AC power, convert the AC power to DC power and output the DC power to the AC cable system, the first converter system being controllable to vary voltage of the DC power over a range extending from a rated HVDC voltage to a second DC voltage lower than the rated HVDC voltage, the rated HVDC voltage being equal to or greater than the rated peak line-to-ground voltage of the AC cable system;

a second power converter system structured to receive the DC power from the AC cable system, convert the DC power to a second AC power, and output the second AC power; and a control system structured to receive power demand information, determine a reduced DC voltage less than the rated HVDC voltage using the power demand information, control the first converter system such that the voltage of the DC power is controlled to the reduced voltage effective to reduce stress on the AC cable system relative to the HVDC voltage, and control the second power converter system to operate in an active power control mode.

2. The system of claim 1 wherein the AC cable system is operatively connected with the first converter system and the second converter system in a symmetric monopole configuration in which a first one of the three cables is used for a positive pole DC power transmission, a second one of the three cables is used for a negative pole DC power transmission, and a third one of the three cables is used a spare.

3. The system of claim 1 wherein the control system controls the first converter system such that the DC power is controlled to the reduced voltage by gradually decreasing the voltage from while the control system controls the second converter system by gradually decreasing the active power output using the power demand information.

4. The system of claim 1 wherein at the first converter system and the second converter system each comprise a modulated multilevel power converter including a plurality of full bridge cells.

5. The system of claim 4 wherein the first converter system comprises the modulated multilevel power converter, and the control system is structured to control the first converter system such that the first converter system is controlled to vary voltage of the DC power over a range from 0% to 100% of the rated HVDC voltage.

6. The system of claim 1 wherein the first converter system and the second converter system each comprise a modulated multilevel power converter including a plurality of full bridge cells and a plurality of half-bridge cells.

7. The system of claim 6 wherein first converter system comprises the modulated power converter, and the control system is structured to control the first converter system such that the DC power is controlled to the reduced voltage by controlling a portion of the plurality of full bridge cells so as to reduce the voltage output of each cell.

8. A method for converting an AC power transmission system to a high voltage direct current (HVDC) power transmission system, the method comprising:
coupling a first converter system to an AC cable system, the first converter system structured to receive AC power with an input, convert the AC power to DC power with a voltage controllable to a rated HVDC voltage and to one or more voltages lower than the rated HVDC voltage, and transmit the DC power with the AC cable system, the AC cable system including a plurality of transmission lines structured to transmit AC power with a rated peak-to-ground AC voltage, the rated HVDC voltage being greater than the rated AC voltage;
coupling a second converter system to the AC cable system, the second converter system structured to receive the DC power from the first converter system, convert the DC power to a second AC power, and output the second AC power;
operating a control system to periodically receive power demand information, calculate a DC voltage less than the rated HVDC using the power demand information, control the first converter system such that the voltage of the DC power transmitted with the first converter system is effective to reduce stress on the AC cabling system relative to the HVDC voltage, and control the second converter system using the power demand information.

9. The method of claim 8 wherein the AC cable system is operatively coupled with the first converter system and the second converter system in a bipole configuration in which a first one of the three cables is used for a positive pole DC power transmission, a second one of the three cables is used for a neutral metallic return, and a third one of the three cables is used for a negative pole DC power transmission.

10. The method of claim 8 comprising coupling a converter transformer including a tap changer to one or more of the first converter system and the second converter system and operating the control system so as to selectively adjust the tap changer position using the power demand information.

11. The method of claim 8 wherein at least one of the first converter system or the second converter system comprises a modulated multilevel power converter including a plurality of half-bridge cells.

12. The method of claim 11 wherein first converter system comprises the modulated power converter, and the control system is structured to control the first converter system such that the DC power is controlled to the voltage less than the rated HVDC voltage by controlling a portion of the plurality of half bridge cells so as to reduce the voltage output of each cell.

13. The method of claim 8 wherein power demand information includes an active power reference value and either a reactive power reference value or an AC voltage reference value.

14. The method of claim 8 comprising operating the control system to receive an emergency control signal, calculate an operating voltage for the DC power transmission in response to the emergency control signal, and operate the first converter system so as to output the DC power using the calculated operating DC voltage.

15. An HVDC power system structured to retrofit a portion of an AC transmission system including a plurality of AC transmission lines structured to transmit AC power with a rated AC voltage, the power system comprising:
an AC/DC converter system operatively coupled to the plurality of AC transmission lines and structured to receive AC power, convert the AC power to DC power with a voltage less than or equal to a rated HVDC voltage greater than the rated AC voltage, and output the DC power;
a DC/AC converter system operatively coupled to the plurality of AC transmission lines and structured to receive the DC power from the AC/DC converter system, convert the DC power to a second AC power, and output the second AC power;
a control system structured to receive power demand information, calculate a DC operating voltage within a range extending over at least 90% to 100% of the rated HVDC voltage effective to reduce stress on the AC transmission lines compared to a constant operating voltage of rated HVDC voltage, operate the AC/DC converter system so as to convert the received AC power to DC power at the calculated DC operating voltage, and to operate the DC/AC converter system so as to convert the DC power to AC power using the power demand information.

16. The power system of claim 15 wherein one of the AC/DC converter system and the DC/AC converter system comprises a modulated multilevel power converter including a plurality of full bridge converter cells or a plurality of half bridge converter cells.

17. The power system of claim 15 comprising a transformer electrically coupled to the AC/DC converter and structured to receive AC power, modify the voltage of the AC power by stepping up or stepping down the voltage, and output the modified AC power to the AC/DC converter.

18. The power system of claim 15 wherein the power demand information includes an active power reference value and either a reactive power reference value or an AC voltage reference value, the reference values corresponding to the AC power transmission system operating conditions.

19. The power system of claim 18 wherein the control system calculates a DC reference voltage value using the active power reference value and the control system operates the AC/DC and DC/AC converter systems using the calculated DC reference voltage value and the received power demand information.

20. The power system of claim 18 wherein the controls system operates the DC/AC converter system so as to convert the DC power to AC power using the active power reference value.

21. The power system of claim 15 wherein the control system includes a plurality of controllers.

* * * * *